United States Patent [19]

Elnozahy et al.

[11] Patent Number: 6,014,686

[45] Date of Patent: Jan. 11, 2000

[54] APPARATUS AND METHODS FOR HIGHLY AVAILABLE DIRECTORY SERVICES IN THE DISTRIBUTED COMPUTING ENVIRONMENT

[75] Inventors: Elmootazbellah Nabil Elnozahy, Austin, Tex.; Vivek Ratan, Lexington, Mass.; Mark Edward Segal, Branchburg, N.J.

[73] Assignee: Telcordia Technologies, Inc., Morristown, N.J.

[21] Appl. No.: 08/880,094

[22] Filed: Jun. 20, 1997

Related U.S. Application Data

[60] Provisional application No. 60/019,999, Jun. 21, 1996.

[51] Int. Cl.[7] ............................. G06F 15/16; G06F 11/30
[52] U.S. Cl. ........................... 709/202; 709/224; 709/219; 714/47
[58] Field of Search ..................................... 709/202, 211, 709/217, 218, 219, 224, 226, 227, 229, 234, 237, 239

[56] References Cited

U.S. PATENT DOCUMENTS

| | | | |
|---|---|---|---|
| 5,408,619 | 4/1995 | Oran | 395/325 |
| 5,426,427 | 6/1995 | Chinnock et al. | 395/200.64 |
| 5,689,701 | 11/1997 | Ault et al. | |
| 5,692,180 | 11/1997 | Lee | |
| 5,713,017 | 1/1998 | Lin et al. | |
| 5,764,914 | 6/1998 | Goto et al. | 395/200.57 |
| 5,784,612 | 7/1998 | Crane et al. | |
| 5,852,724 | 12/1998 | Glenn, II et al. | 395/200.69 |
| 5,857,191 | 1/1999 | Blackwell, Jr. et al. | 395/200.45 |

*Primary Examiner*—Frank J. Asta
*Assistant Examiner*—Almari Romero
*Attorney, Agent, or Firm*—Joseph Giordano

[57] ABSTRACT

In the Distributed Computing Environment (DCE) standard, availability of directory services is increased by apparatus and methods using agents inserted between requesting clients and servers. By using agents, additional functions are carried out which are not performed in a typical DCE environment. Each agent inserts itself between the requesters and servers by writing over the pointer to the server with information pointing to the agent, thus redirecting requests to themselves. The agent then receives incoming requests and forwards them on to its associated server and other agents. The agent handling requests for the master server is called the "master" agent and the agents handling requests for replica servers are "replica" agents. The agents make sure requests are performed before replying to the original requester. Agents also monitor themselves. If a master agent crashes, the remaining agents elect a new master agent. If a replica agent crashes the master agent excludes the agent from further communications. The apparatus and methods provide a highly available and robust directory server.

6 Claims, 4 Drawing Sheets

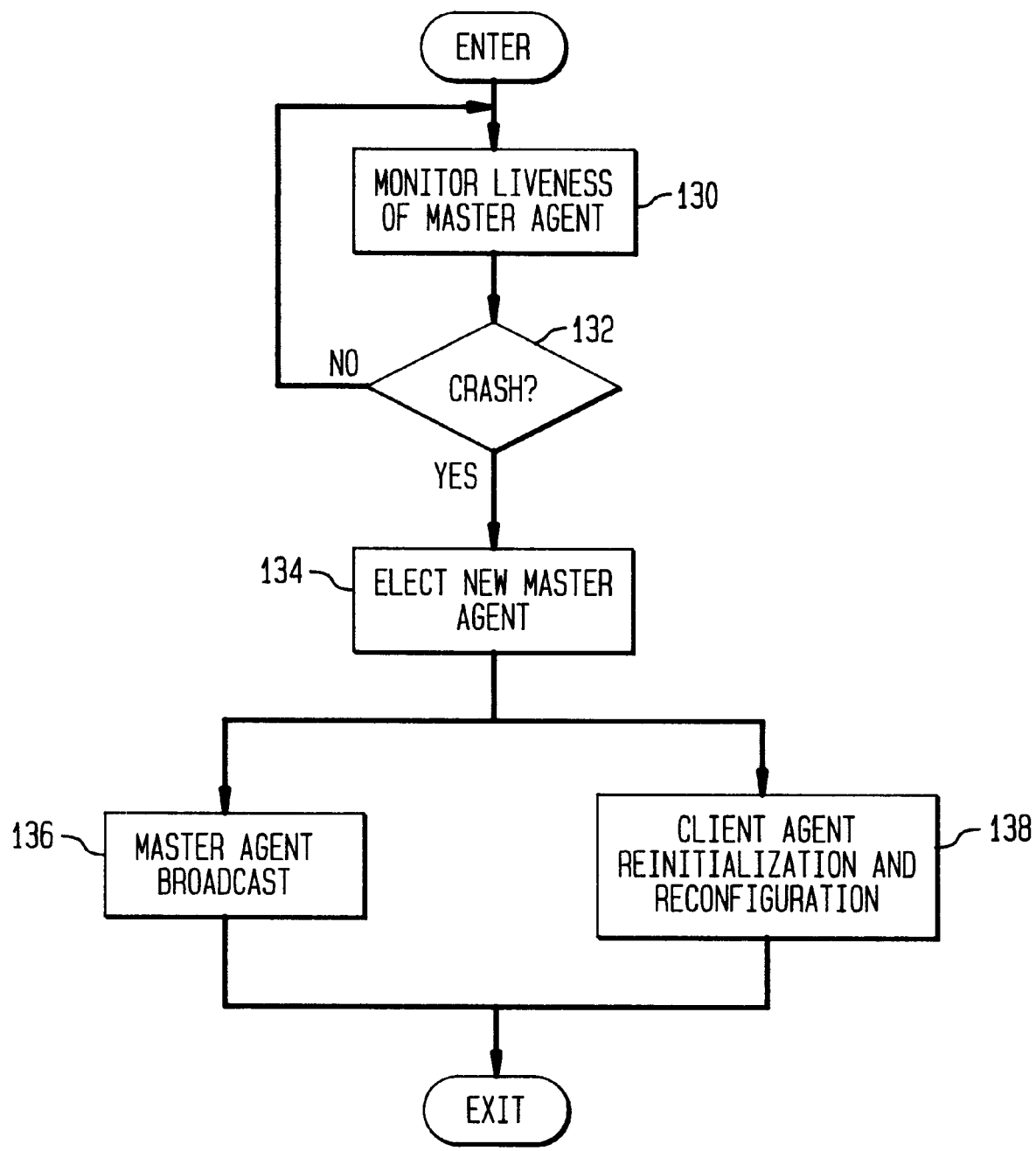

APPARATUS AND METHODS FOR HIGHLY AVAILABLE DIRECTORY SERVICES IN THE DISTRIBUTED COMPUTING ENVIRONMENT

This application claims benefit of Provisional Application 60/019,999 filed Jun. 21, 1996.

BACKGROUND OF THE INVENTION

The present invention relates generally to a highly available directory service, and in particular to apparatus and methods for a highly available directory service in Distributed Computing Environment.

The Distributed Computing Environment (DCE) is a suite of software utilities and operating system extensions that can be used to create applications on networks of heterogeneous hardware—PCs, Unix workstations, minicomputers and mainframes. The DCE is a standard developed by the Open Software Foundation (OSF) and is designed to simplify building heterogeneous client/server applications. Several services are provided by DCE: Remote Procedure Call (RPC) facilitates client-server communication, so that an application can effectively access resources distributed across a network; Security Service authenticates the identities of users, authorizes access to resources on a distributed network, and provides user and server account management; Directory Service provides a single naming model throughout the distributed environment; Time Service synchronizes the system clocks throughout the network; Threads Service provides multiple threads of execution capability; and, Distributed File Service provides access to files across a network.

Directory Service performs typical naming services in a distributed computing environment and acts as a central repository for information about resources in the distributed system. Typical resources are users, machines, and RPC-based services. The information consists of the name of the resource and its associated attributes. Typical attributes include a user's home directory or the location of an RPC-based server.

The Directory Service provides a distributed and replicated repository for information on various resources of a distributed system, such as location of servers, and the services they offer. Clients use the name space to locate service providers in a well-defined, network-independent manner. The Directory Service consists of a Global Directory Service (GDS) that spans different administrative domains and a Cell Directory Service (CDS). A cell is the unit of management and administration in DCE and typically consists of a group of machines on a local area network. CDS maintains a local, hierarchical name space within the cell. The Cell Directory Service manages a database of information about the resources in a group of machines called a DCE cell. The GDS enables intercell communications by locating cells which have been registered in the global naming environment. The present invention focuses on enhancing the availability and accuracy of CDS.

The CDS name space is partitioned over one or more CDS servers to improve the scalability and availability of the service. A CDS server maintains an in-memory database, called a clearinghouse, to store the cell's name space or portions thereof. Clients access a server using the DCE RPC mechanism. CDS servers typically announce their presence by broadcasting their network addresses periodically over the local area network.

The performance and availability of CDS is crucial to applications built using DCE, especially for those applications having high availability requirements. To address these requirements, CDS names may be replicated on different servers. The replication model follows the primary copy approach. The unit of replication is a directory, but subdirectories of a replicated directory are not automatically replicated. One physical copy of a directory is designated a master replica, while the others are designated read-only replicas. Updates can only be made to the master replica. Lookups can be handled by any server that contains a copy of the directory. This design helps offload lookup requests from the site containing the master copy of an entry. Should the server containing the master copy of a directory entry fail, CDS continues to service lookup requests for that directory through the available replicas, although no update requests can be handled until the server containing the master replica recovers from failure or a new master replica is created.

DCE allows flexibility in specifying which directory entries are to be replicated and the degree of consistency across replicas. The CDS propagates updates to the read-only replicas, either immediately after performing the update on the master copy or after a certain amount of time, depending on the desired degree of consistency. The propagation occurs on a best-effort basis. If a failure occurs in communication, the propagation is periodically retried in the background until it succeeds.

There are several deficiencies in CDS specifications that affect naming service availability and correctness. The DCE CDS falls short in providing the necessary degree of availability. Furthermore, CDS often returns inconsistent or incoherent information as a result of a lookup, making correct operation impossible.

CDS propagates an update to read-only replicas after it sends the corresponding reply to the client. Consider the scenario where a DCE application sends a request to advertise its services in the name space. The server containing the master replica of the corresponding name space entry may fail after sending the reply to the application but before propagating the updates to the read-only replicas. In such a case the application's advertisement will not be available until the server maintaining the master replica recovers, which may take a long time. The application itself is not aware of the problem since it has received a reply indicating that the advertisement was properly handled and therefore would not attempt any corrective action.

Another problem related to CDS operation is that lookups performed on CDS replicas do not necessarily return correct information. This occurs if the master replica does not immediately propagate updates to the other replicas, or if a communication failure prevents such updates from reaching the replicas. Applications, therefore, cannot trust information returned by read-only replicas.

In the case of failure of a CDS server that maintained the master replica of a directory, CDS allows a read-only replica of the directory, on another server, to be promoted to a master replica. There are three problems with using this mechanism. First, this mechanism fails if the security server was also running on the same machine as the failed CDS server (as is common in commercial installations). As a result, the system is effectively susceptible to a single point of failure with respect to update requests for some directory entries. Second, this mechanism needs to be executed for every directory for which the failed server maintained a master replica. Obtaining a list of each such directory is cumbersome and time consuming. Finally, the entire reconfiguration mechanism requires manual intervention and can take many minutes to execute, rendering it inadequate when a high degree of availability is required.

Another related problem is that CDS does not support any form of automatic failure detection or reconfiguration. The failure of a CDS server is detected by RPC timeouts in clients invoking operations on the server. Failed servers must then be manually restarted and configured into the system, as described earlier.

What is needed then is a system which overcomes the above problems in order to provide a robust and accurate directory service.

DESCRIPTION OF THE INVENTION

The present invention relates to apparatus and methods for a highly available directory service. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

Systems consistent with the present invention provide enhanced CDS by supporting the partial replication of the name space, continuous and correct operation of the service, and automatic failover. The enhancements ensure the consistency of the name space data and are transparent to application developers and end users, all without a significant performance penalty. The present invention can be added to any existing DCE implementation and will use existing DCE components without requiring changes or replacements to the standard components or knowledge of their internal implementation.

DCE provides a distributed and replicated CDS which implements a hierarchical name space that can be used for a variety of purposes. Systems consistent with the present invention have servers that use the CDS to advertise themselves so that clients may locate them. Clients locate the desired servers by searching this name space. They also rely on the name service to locate backup servers in the presence of failures. The continuous availability of the CDS and the coherence and consistency of its information are therefore crucial to the successful operation of the system.

To achieve the objects and in accordance with the purpose of the invention, as embodied and broadly described herein, the invention comprises apparatus for maintaining directories, comprising a first directory, a first server for managing the first directory, and a first agent for intercepting a request to the first server and forwarding the request to the first server and a second agent. The invention also comprises methods comprised of the steps of storing a first directory, managing the first directory using a first server, and intercepting a request to the first server, forwarding the request to the first server and a second agent.

The directory service as specified by OSF/1 and implemented by independent vendors suffers from several problems that affect its correct operation and availability. Since the standard is distributed in the form of working code that is identical among all vendors, applications that use this service cannot rely on it for correct operation and cannot function properly when high availability is required. The present invention consists of apparatus and methods that could be added to any existing directory service implementation of DCE to correct its behavior and improve its availability. The apparatus and methods need no knowledge of the internal workings of DCE or the source code of the service and do not need to change the DCE's directory service implementation, working code, or applications. The apparatus and methods can therefore be added seamlessly into any existing DCE implementation without any changes to existing components.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings:

FIG. 4 is a flowchart illustrating master crash monitoring and election of a new master in response to a master crash.

BEST MODE FOR CARRYING OUT THE INVENTION

Reference will now be made in detail to the present preferred embodiment of the invention, which is illustrated in the accompanying drawings.

The present invention is comprised of extensions to a commercial CDS server system. The extensions increase the robustness and accuracy of the CDS server system. The highly-available CDS in accordance with the present invention appears to clerks running on clients of the CDS as a single CDS server that is accessible through standard DCE interfaces. The present invention thus ensures compatibility with existing clerks without modifying them. The hierarchical name space managed by the CDS servers contains a Ahighly-available subtree@ whose root is a name space entry maintained by the CDS server. Entries in this subtree appear to clerks as non-replicated entries that are accessible as defined in the DCE standard. Unlike the standard CDS operation, the present invention guarantees that access to entries in the subtree will be highly available for lookups as well as updates. The present invention also guarantees that lookups for these entries return the most recent version. Although the preferred embodiment disclosed herein implements a highly available subtree, the present invention may also be used to make the entire tree highly available.

Because the present invention inserts agents between well-established CDS entities (i.e., the client clerk and CDS server), it can be used in any DCE implementation. There is no need to modify the source code of the DCE implementation to insert the agents. The agents appear to the clerks as typical CDS servers.

Figure 1:
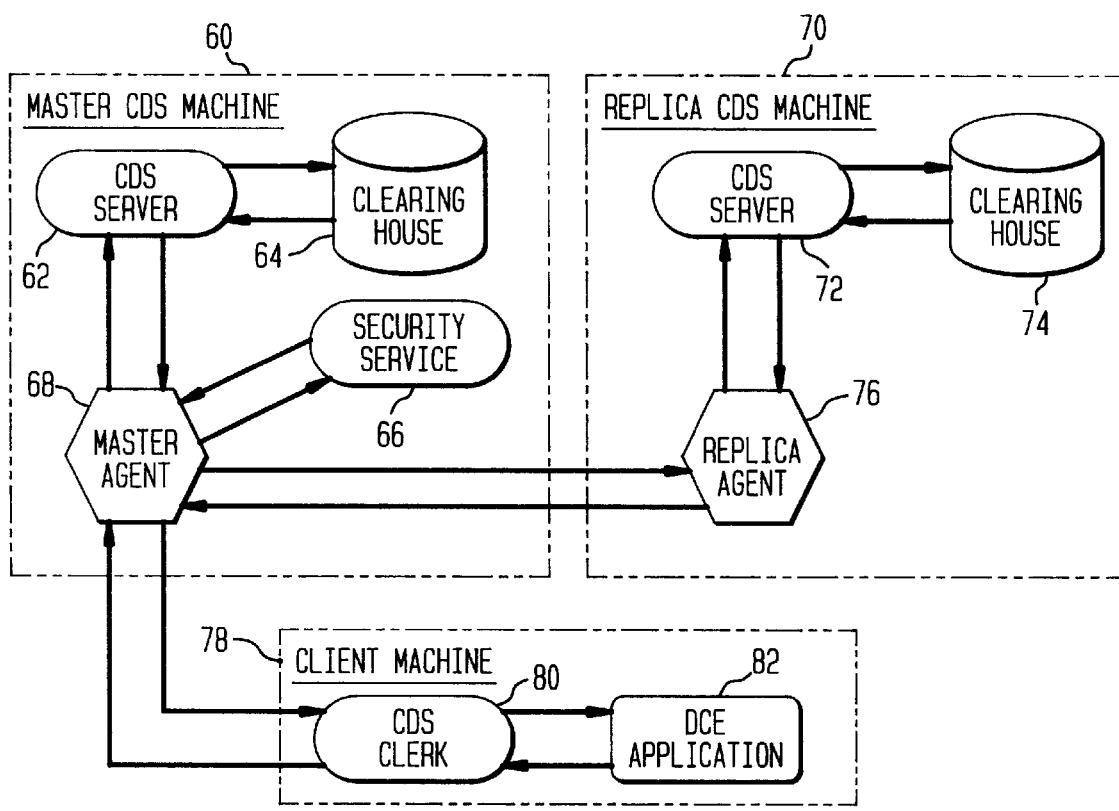
FIG. 1 is a block diagram showing a system name server architecture in accordance with the principles of the invention.

FIG. 1 is a block diagram showing a server architecture consistent with the principles of the present invention.

Master CDS machine 60 is comprised of a CDS server 62, clearinghouse 64, and security service 66. Master agent 68 is used in accordance with the principles of the present invention to handle requests from client machine 78. Client machine 78 is comprised of a CDS clerk 80 and DCE application 82.

Client machine 78 represents one or more clients which make requests to the CDS server system. Client machine 78 executes DCE application 82, which periodically requires directory information. CDS clerk 80 handles these requests.

The architecture further includes one or more replica CDS machines, represented by CDS machine 70. Replica CDS machine 70 is primarily comprised of CDS server 72 and clearinghouse 74, as is commonly understood in the DCE standard. In accordance with the principles of the present invention, replica CDS machine 70 is also comprised of replica agent 76 which handles name server requests received from master CDS machine 60 or other replica CDS machines 70.

The highly available CDS in accordance with the principles of the present invention consists of two main components: standard CDS servers 62 and 72 and high-availability agents 68 and 76. Each CDS server maintains at least a partial copy of the highly-available subtree in its clearinghouse 64 and 74, respectively. The subtree contains CDS naming information. Support for this replication, however, does not rely on the existing CDS replication mechanism, thus avoiding the problems outlined above. Each of the standard CDS servers is configured to run as the only standard master CDS server of the cell and is not aware of any of the other servers. This configuration is unusual since DCE allows only one standard master CDS server per cell. To overcome this problem, the advertisements from each server are turned off and master agent 68 performs the advertisement function for the cell. Turning the advertisement function on and off in a server is well understood in DCE.

Turning off the advertisements from the vanilla CDS servers is necessary to prevent clients from accessing them directly and bypassing the replica agents. Also, DCE is not configured to allow more than one master CDS server in a replicated server group. The present invention makes each CDS server a master component as is well understood, specified, and implemented by DCE. Such an arrangement thus would not be possible without turning off the advertisements.

The number of the standard CDS servers can be varied and depends on the degree of availability required. One of the servers is designated as a Amaster server @, in this case master CDS machine 60, while the others are designated as Areplica servers @, such as replica CDS machine 70. Although FIG. 1 shows a single replica server 70, several may be present. This configuration allows use of the underlying support of CDS for maintaining clearinghouses, thus reducing development costs and allowing the use of existing CDS backups and manipulation tools which depend on the format of the clearinghouse. It also allows using the invention to be used with clearinghouses that contain existing name spaces, making it possible to add the apparatus and methods disclosed herein to existing DCE installations. Agents 68 and 76 manage replication, ensure consistency and coherence, and maintain the system configuration.

Agents 68 and 76 run on each CDS machine. Agent 68 runs on the same machine as the master server and is called the master agent. Agents, such as agent 76, running on machines with replica servers, are called replica agents. A different type of agent, herein called client agent, runs on each CDS client in the cell.

Figure 2:
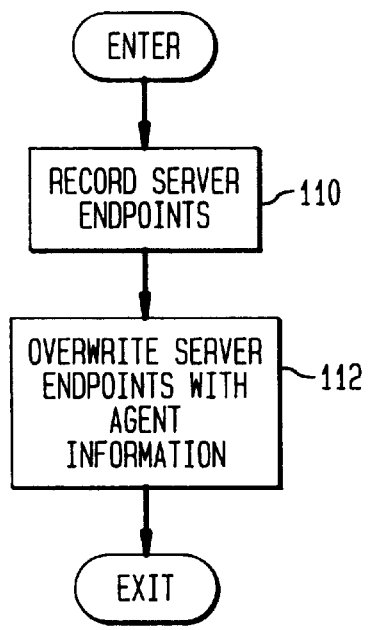
FIG. 2 is a flowchart illustrating how an agent interposes itself between a client and a server.

FIG. 2 is a flowchart showing how each agent inserts itself between the CDS clerk 80 and CDS servers 62 and 72. Master agent 68 and replica agents 76 transparently insert themselves between the CDS clerks and the standard CDS servers through an unconventional manipulation of the DCE address resolution mechanism. The agent first records the CDS server's endpoint information (step 110) before overwriting the information. This allows the agent to still communicate with the CDS server. Each server may have several endpoints. Each agent then exports its information to the RPC endpoint mapper on its machine (which is responsible for directing RPCs to the appropriate process), in effect overwriting the corresponding standard CDS server's endpoints (step 112). The master agent then acts as the standard master CDS server by advertising itself as such. Master agent 68 can now intercept RPCs from CDS client 78 that are sent to master CDS server 62.

Figure 3:
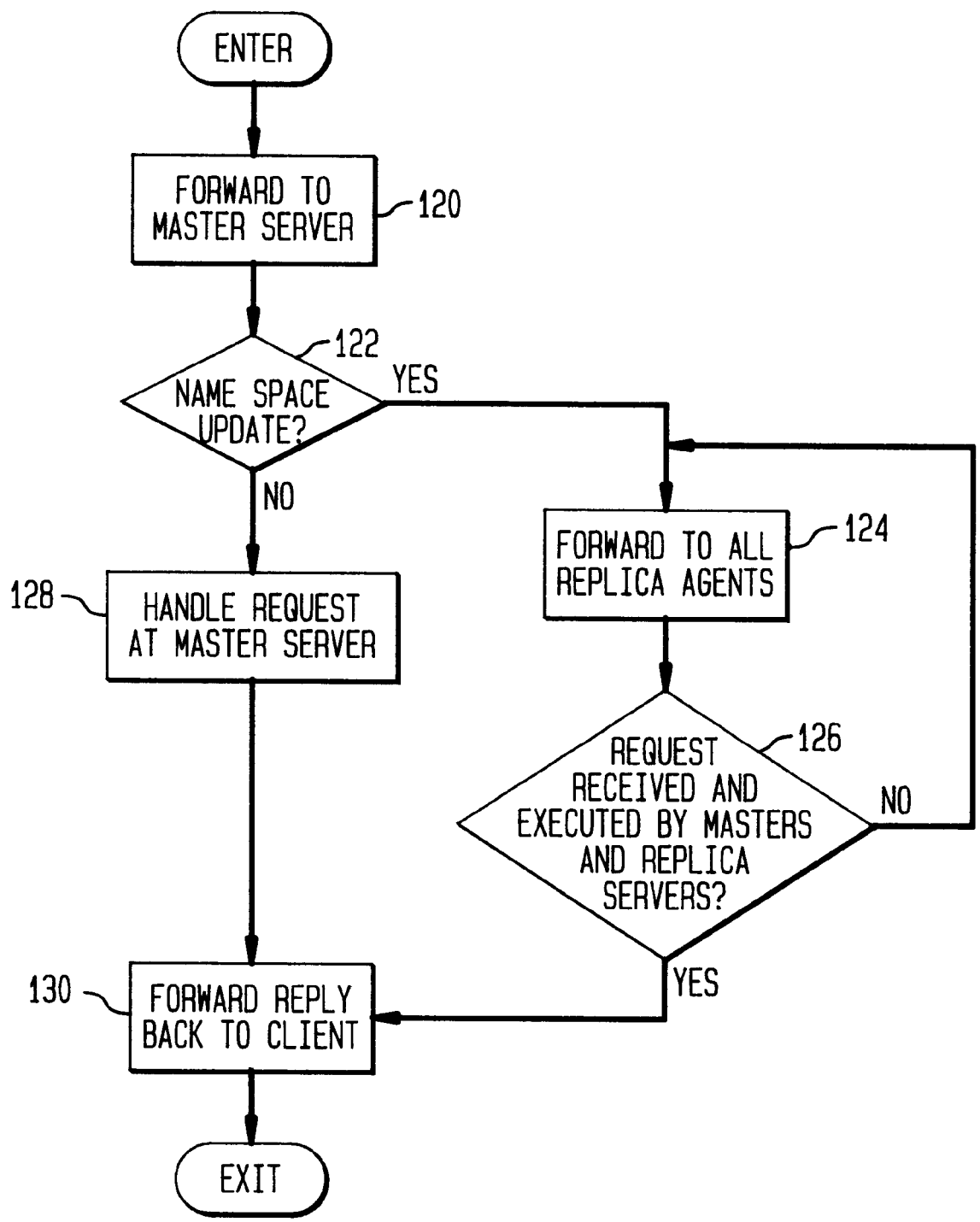
FIG. 3 is a flowchart illustrating propogation of name space update requests.

The process of intercepting RPCs is detailed in FIG. 3. Master agent 68 forwards the client request to master CDS server 62 on its machine (step 120). If the request requires an update of the name space (step 122) master agent 68 also forwards the request to each available replica agent (e.g., agent 76) (step 124). Each replica agent in turn forwards this request to the replica server on its machine (step 124). The client operation is performed on the master clearinghouse 64 as well as on each of the replica clearinghouses 74, thus keeping the various clearinghouses consistent. Once master agent 68 determines that the update request has been handled by the master CDS server 62 and by each of the available replica servers 72 (step 126), master agent 68 forwards the reply from master CDS server 62 back to client 78 (step 130). If the replica servers have not executed the request, the request is forwarded again (step 124). If the request is not a name space update, it is handled at master CDS machine 60 (step 128).

The modified server in accordance with the present invention is also integrated with the DCE security service 66. When master agent 68 receives a CDS request, it authenticates client 78 and verifies whether the client has proper authorization to perform the corresponding operation. This step is necessary because the indirection introduced by master agent 68 makes master CDS server 62 perceive master agent 68 as the "client," and thus uses its security credentials for authorization checking, instead of the real client's credentials. This mechanism duplicates the authentication and authorization checks performed by a clearinghouse. Alternatively, the system could use security delegation, which enables an intermediary to act on behalf of a client by using the client's security credentials. This feature obviates the need for master agent 68 to perform security checks.

FIG. 4 is a flowchart illustrating how replica agents monitor liveness of master agent 68. Liveness of master agent 68 is determined from whether or not master agent 68 has crashed. If master agent 68 has not crashed, it is alive. Each replica agent, such as replica agent 76, monitors liveness of the master (step 130), which is manifested as a communications failure in DCE RPC, as is understood in the art. If the machine 60 where master agent 68 resides crashes (step 132), the replica agents, such as replica agent 76, elect a new master agent (step 134). Electing a new master may be based on location, load, or any of a variety of other criteria for selecting a new master agent. The new master agent immediately starts broadcasting advertisements about itself and is ready to accept CDS requests from clients (step 136). Continuous availability of lookup and update requests is thus provided, because the new master is immediately ready to accept CDS requests. Further, since the new master had an up-to-date version of each directory entry, clients are guaranteed to obtain coherent data from the new master, contrasting the operation of vanilla CDS where clients may obtain stale or incoherent information in similar situations. The new master agent also broadcasts this designation change to all client agents on the local network (step 136). In parallel, each client agent reinitializes the clerks' cache and reconfigures the client to run with the new cell master (step 138). This step is necessary to remove any persistent bindings that existed with the failed agent.

Figure 5:
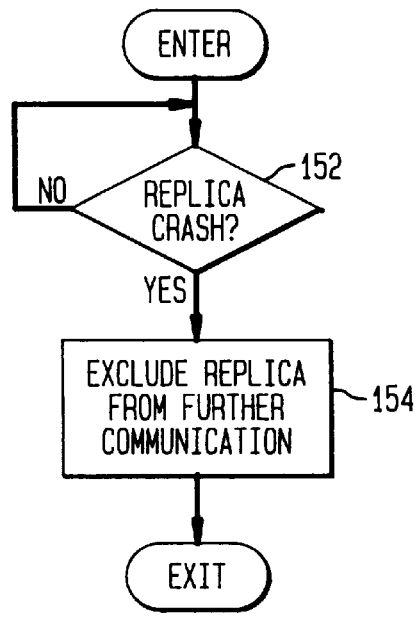
FIG. 5 is a flowchart illustrating detection of a replica machine crash and exclusion of the replica from future operations.

FIG. 5 is a flowchart of steps performed by the master agent to handle a crash of the machine on which a replica agent resides. This failure is detected by the master agent when it forwards a client request to each of the replica agents (step 152). The failed replica agent is then excluded from further communication (step 154). An alternative embodiment dynamically integrates new replica agents. This enables failed replica agents, as well as new agents, to restart and dynamically join the highly available system.

Several experiments quantify the performance impact of adding high availability to CDS. Latency increase and throughput reduction resulting from performing name space updates were measured. The performances of lookups were also measured and are essentially the same. These two performance metrics are particularly important for failure-free operation and represent the direct performance cost that applications pay in return for high availability and correctness. The experiments also measured the failover time which qualifies the duration of service unavailability due to a failure in the master CDS server. The experimental environment consists of a switched 10 Mb/s Ethernet network connecting a number of Digital Equipment Corporation (DEC) 3000/400 workstations. Each workstation runs Digital UNIX (OSF/1) v3.0 or higher, DEC's DCE version 1.3, and is equipped with a 133 MHz Alpha processor and 64 MB of memory.

Latency is measured as the time between an application issuing an update request and receiving the corresponding reply from a remote CDS server. An administration tool, cdscp, which is part of the DCE installation and allows end users to manipulate objects in CDS (performance was also measured at the Name Space Library level, and results are identical) was used. A request to create an object in CDS through cdscp takes an average of 404 milliseconds using the vendor-supplied CDS server. About 92% of this time (372 milliseconds) is spent on the client side in the cdscp interface and clerk processing, about 10 milliseconds on the CDS server creating the entry, and the rest on processing the RPC. The same operation takes an average of 461 milliseconds for a modified CDS server (with no backup), showing a latency increase of about 14%.

As mentioned earlier, the modified server in accordance with the present invention needs to perform authorization checks on a client request. In the absence of security delegation, these checks are necessary but duplicate the functionality provided at a clearinghouse. About 53 out of the 57 milliseconds of additional time is spent doing these checks. The remaining 4 milliseconds are the actual cost incurred by the master agent in intercepting RPCs and forwarding it to its clearinghouse. The security delegation functionality on another platform has also been used, and using this functionality potentially reduces latency costs significantly. Another way to reduce latency costs is to cache the authorization information of objects in the replicated name space with the master agent when they are created.

TABLE 1

| | Measurements of latency (ms) and throughput (requests/sec), without security checks. | | | | | |
|---|---|---|---|---|---|---|
| # replicas | standard | 0 | 1 | 2 | 3 | 4 |
| Latency | 404 | 408 | 414 | 419 | 423 | 429 |
| Throughput | 3.09 | 3.09 | 3.08 | 3.07 | 3.07 | 3.06 |

Table 1 compares the latency for a single update request, without performing any authorization checks, for a standard CDS server with our modified server with different numbers of CDS replicas. The master agent concurrently forwards RPCs to replica agents, and the extra overhead of 4–6 msec whenever an extra replica is added to the system is due to the cost of thread manipulation and context switching, parameter copying (to generate messages to each replica), and synchronization (waiting for replicas to finish before sending a reply to the client). This relatively small overhead shows that it is feasible to use a relatively large number of replicas for added reliability, without a significant performance penalty.

Throughput is measured as the maximum rate of concurrent update requests that CDS can handle. This rate was found to be an average of 3.09 requests/second for the vendor's CDS server, and 3.01 requests/second for our server with no backup. The reduction in the throughput is thus less than 3%, most of which is due to the redundant authorization check that the agent has to perform. Excluding the security checks (see Table 1), the throughput of the server with no backup is also around 3.09 requests/sec, essentially the same as that of the vanilla server. Furthermore, the throughput reduces by less than 0.5% every time an additional replica is added. These figures are surprisingly low given that agents add extra overhead and serialize all update requests. This can be ascribed to the fact that the cost of the call from an agent to the CDS server to create an entry is a very small compared to the overall cost of the operation, when initiated from a client. Furthermore, throughput is increased by multi-threading at the agents and the CDS servers.

It takes a total of 3.2 seconds for a replica server to detect a failure and become the new master server (this does not include the timeout period). This figure primarily includes the time to restart the security server on the replica's machine, broadcast the change to client agents, and start advertising information about the new master. Reinitializing a clerk's cache requires 77.36 seconds, using a slightly modified version of the vendor supplied DCE script (called dcesetup). This large figure reflects the time necessary to configure a CDS clerk. This process requires restarting all local DCE server daemons, deleting the persistent cache, and communicating with the CDS and security servers. Nevertheless, the new master server is available to handle requests while clerks reconfigure.

The present invention interposes an agent between CDS clerks and the standard servers. Unlike CDS, the present invention allows continuous updates even if the master clearinghouse fails, ensures coherent information in clerks' caches, guarantees consistency among the replicas of the name space, and includes support for automatic configuration without operator intervention. The performance penalty for these benefits is about 14% in latency and 3% in throughput. Most of this penalty is due to extra authorization checks that will be removed in newer versions of DCE.

The present invention provides several advantages. First, it is compatible with existing CDS clerks, which are the processes on client machines that maintain the local cache and act as proxies for remote CDS servers. Second, the invention provides continuous operation availability of lookup and update requests despite failures. Third, the present invention also ensures correct operation. For example, an update must be performed on all available backups before a reply is sent to the clerk. Fourth, the failover period is short. A backup must take over in a time span that is less than a reasonable timeout value that the clients use in communicating with the server. Fifth, the present invention is transparent to the clerks and application programs to the greatest extent possible. Finally, all these features are provided with a small performance penalty.

Although the present invention focuses on CDS, the principles described herein could be applied to other directory services.

Other embodiments of the invention will be apparent to those skilled in the art from consideration of the specification and practice of the disclosed embodiments. The specification and examples are exemplary only, and the true scope and spirit of the invention is defined by the following claims and their equivalents.

We claim:

1. Apparatus for a Distributed Computing Environment (DCE) including a first and at least one second Cell Directory Service (CDS) machine and a DCE client machine, including a CDS clerk for communicating with said first CDS machine, said apparatus providing automatic failover to said second machine on failure of said first machine and said apparatus comprising a first CDS name server in said first CDS machine and a second CDS name server in each said second CDS machine, a first agent in said first CDS machine distinct from and not a part of said first CDS name server but connected to said first CDS name server and to said CDS clerk in said DCE client machine, and a second agent in said second CDS machine distinct from and not a part of said second CDS name server but connected to said second CDS name server and to said first agent, said first agent intercepting requests to said first CDS machine from said CDS clerk in said DCE client machine and forwarding the requests to said second agent.

2. The apparatus in accordance with claim 1 further comprising a security service connected to said first agent for determining that said CDS clerk in said DEC client machine is authorized to request changes in said first CDS name server.

3. A method for providing automatic failover from a first Cell Directory Service (CDS) machine acting as a master to a second CDS machine to act as a master in a Distributed Computing Environment (DCE), said first CDS machine including a first CDS name server and a first agent distinct from and not a part of said first CDS name server but connected thereto and said second CDS machine including a second CDS name server and a second agent distinct from and not a part of said second CDS name server but connected thereto, said method comprising the steps of forwarding from a DCE client machine to said first CDS name server a request to update a name, intercepting said request at said first agent and forwarding said request from said first agent to said first CDS name server to update its clearinghouse and to said second agent, said second agent forwarding said request to said second CDS name server to update its clearinghouse, said second agent monitoring the state of said first CDS machine, and said second CDS machine becoming the master upon detection by said monitoring step of a failure of said first CDS machine.

4. The method in accordance with claim 3 further comprising the step of said second agent causing said second CDS name server to broadcast to the DCE client machine that said second CDS machine is then the master.

5. A method for providing automatic failover from a first Cell Directory Service (CDS) machine having a server and a first agent distinct from said first CDS server but connected thereto, said first agent acting as a master in a Distributed Computing Environment (DCE), to one of a plurality of second CDS machines each having a server and a second agent distinct from a second CDS server but connected thereto, each said second agent capable of acting as a master in the Distributed Computing Environment on failure of said first machine, said method comprising the steps of monitoring by one of said second agents of one of said second CDS machines the state of said first agent of said first CDS machine, and electing one of said second machines as a new master upon detection by said monitoring step of a failure in said first CDS machine.

6. The method in accordance with claim 5 further comprising said second agent of said new master machine causing the broadcasting that said second agent of said new master machine has replaced said first agent for receipt of requests in the DCE environment.

* * * * *